(12) United States Patent
Thumm et al.

(10) Patent No.: US 10,533,605 B2
(45) Date of Patent: Jan. 14, 2020

(54) METHOD FOR PRODUCING AN INTERNALLY STRUCTURED SLIDE BEARING BUSHING

(71) Applicant: WIELAND-WERKE AG, Ulm (DE)

(72) Inventors: Gerhard Thumm, Erbach (DE); Volker Voggeser, Senden (DE)

(73) Assignee: WIELAND-WERKE AG, Ulm (DE)

( * ) Notice: Subject to any disclaimer, the term of this patent is extended or adjusted under 35 U.S.C. 154(b) by 316 days.

(21) Appl. No.: 14/935,821

(22) Filed: Nov. 9, 2015

(65) Prior Publication Data

US 2016/0146250 A1 May 26, 2016

(30) Foreign Application Priority Data

Nov. 25, 2014 (DE) .......................... 10 2014 017 426

(51) Int. Cl.
*B21C 1/26* (2006.01)
*B21D 17/02* (2006.01)
(Continued)

(52) U.S. Cl.
CPC ............ *F16C 33/1065* (2013.01); *B21C 1/26* (2013.01); *B21D 17/02* (2013.01); *B21D 53/10* (2013.01);
(Continued)

(58) Field of Classification Search
CPC ...... B21D 22/20; B21D 22/225; B21D 22/28; B21D 17/02; B21D 17/025;
(Continued)

(56) References Cited

U.S. PATENT DOCUMENTS 2,392,797 A 1/1946 Hackett
3,608,346 A 9/1971 Marciniak
(Continued)

FOREIGN PATENT DOCUMENTS

DE 2 257 071 A1 5/1973
DE 195 32 951 A1 3/1997
(Continued)

OTHER PUBLICATIONS

Search Report of European Patent Office issued in Application No. 15003081 with English translation, together with English translation of category of cited documents dated Feb. 10, 2016 (11 pages).
(Continued)

*Primary Examiner* — Christopher J Besler
(74) *Attorney, Agent, or Firm* — Flynn Thiel, P.C.

(57) ABSTRACT

A method for producing an internally structured slide bearing bushing involves the following steps:
a) providing a slide bearing bushing with at least one bearing region which is formed as a hollow cylinder with an internal surface and which has an external diameter and an internal diameter,
b) providing an external tool with a through-opening,
c) providing an internal tool which has an integral cylindrical operating region with an external surface with a structure,
d) inserting the internal tool into the bearing region of the slide bearing bushing,
e) introducing the slide bearing bushing and the internal tool into the conical widened portion of the through-opening of the external tool,
f) pressing the slide bearing bushing into the through-opening of the external tool,
g) removing the slide bearing bushing from the through-opening of the external tool, and
h) radially widening the slide bearing bushing.

4 Claims, 4 Drawing Sheets

Figure 1:
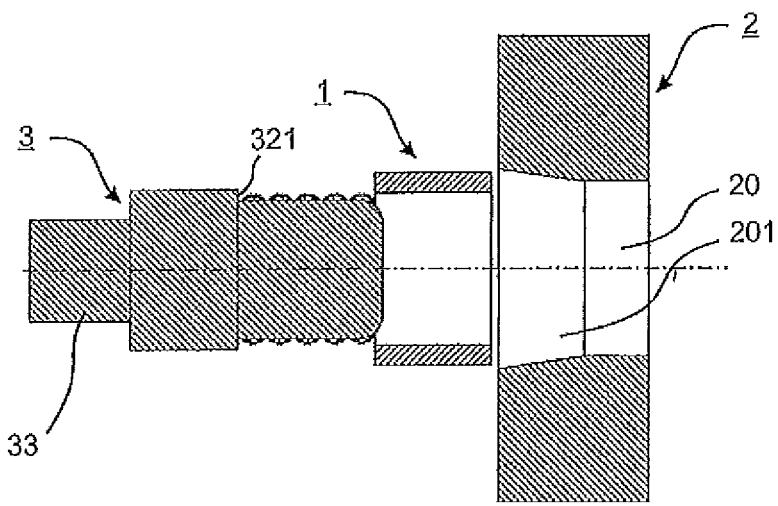

(51) Int. Cl.
| | |
|---|---|
| *B21C 23/01* | (2006.01) |
| *B21C 1/24* | (2006.01) |
| *F16C 33/10* | (2006.01) |
| *B21K 1/04* | (2006.01) |
| *B21D 53/10* | (2006.01) |
| *F16C 33/14* | (2006.01) |
| *F16C 43/02* | (2006.01) |

(52) U.S. Cl.
CPC ............... *B21K 1/04* (2013.01); *F16C 33/14* (2013.01); *F16C 43/02* (2013.01); *B21C 1/24* (2013.01); *B21C 23/01* (2013.01); *F16C 2220/40* (2013.01)

(58) Field of Classification Search
CPC ........... B16C 2220/40; B16C 2220/42; B16C 2220/48; B21C 23/01; B21C 1/24; B21C 1/26
See application file for complete search history.

(56) References Cited

U.S. PATENT DOCUMENTS

| | | | |
|---|---|---|---|
| 3,830,087 A | | 8/1974 | Nakamura et al. |
| 3,866,450 A | | 2/1975 | Marciniak et al. |
| 4,048,703 A | * | 9/1977 | Lehnhart ................ B21D 53/10 29/898.057 |
| 4,217,770 A | * | 8/1980 | Wassen ..................... B21C 1/24 72/349 |
| 4,435,972 A | * | 3/1984 | Simon .................... B21C 23/14 138/109 |
| 5,282,377 A | | 2/1994 | Illig et al. |
| 5,692,560 A | * | 12/1997 | Messant .................... F28F 1/40 165/151 |
| 6,038,901 A | | 3/2000 | Stein et al. |
| 7,334,337 B2 | | 2/2008 | Matsuura |
| 7,987,598 B2 | | 8/2011 | Yeh et al. |
| 2004/0213487 A1 | | 10/2004 | Matsuura |
| 2006/0112558 A1 | * | 6/2006 | Lorenz ...................... B21C 1/24 29/890.144 |
| 2006/0123630 A1 | | 6/2006 | Matsuura |
| 2006/0261135 A1 | * | 11/2006 | Midgett .................... A44C 9/00 228/136 |
| 2007/0151104 A1 | | 7/2007 | Yeh et al. |

FOREIGN PATENT DOCUMENTS

| | | |
|---|---|---|
| DE | 10 2004 020 003 A1 | 11/2004 |
| DE | 10 2006 062 427 A1 | 8/2007 |
| EP | 0 295 919 A2 | 12/1988 |
| EP | 0 949 427 A1 | 10/1999 |
| GB | 2 064 676 A | 6/1981 |
| GB | 2 257 071 A | 1/1993 |
| GB | 2 400 892 A | 10/2004 |

OTHER PUBLICATIONS

European Office Action (machine translation) for corresponding application No. 15 003 081.5, dated Oct. 26, 2017 (3 pgs.).

* cited by examiner

METHOD FOR PRODUCING AN INTERNALLY STRUCTURED SLIDE BEARING BUSHING

The invention relates to a method for producing an internally structured slide bearing bushing.

In sliding elements, the sliding surfaces are frequently designed with lubrication grooves or lubrication pockets in order to achieve a satisfactory supply of lubricant. In particular, lubrication pockets are adapted in shape and size to the conditions of the load and movement. Often, the lubrication pockets are evenly distributed over the entire running surface. Thus the lubrication pockets enable a bearing point to have a uniform film of lubricant over the entire bearing surface. In roll-formed slide bearing bushings, already during the manufacturing process the desired structure may be rolled onto the strip material used, before the bushing is shaped to its final size. It is more difficult when internally located structures have to be incorporated in turned bearing bushings.

For example, such a method is disclosed in the publication DE 10 2004 020 003 A1. An internal structure is produced in a cylindrical bearing element with a narrow bore, the capacity for the lubricating oil to be retained on the bearing surface being improved thereby. Blind grooves are produced during the production of the bearing element, said blind grooves extending in the longitudinal direction of the cylindrical internal region and not reaching the front faces. In addition, starting from an open end, the seamless bearing element is initially made into a conical shape. Subsequently, the blind grooves are formed on the conical internal surface by means of a groove shaping tool which is inserted through the widened end into the central cylindrical body portion. Then the cone is transferred into a round cylindrical bushing shape by a further shaping tool. The bearing element then has blind grooves in a seamless cylindrical central portion of the internal hollow cylindrical surface of the bearing element.

Moreover, a sintered slide bearing in the form of a hollow cylinder with a structure incorporated on the internal cylindrical surface is disclosed in the publication GB 2 064 676 A. The structure consists of raised portions and recessed portions which extend over the entire length in a linear manner parallel to the cylinder axis. These structures are stamped by means of an internal mandrel such as a die, via a drawing process.

An internally structured bearing bushing made of a porous material is additionally disclosed in the publication EP 0 949 427 A1. The internal structures are pressed into a smooth internal surface. To this end, a cylindrical punch is used, domed stamping devices being arranged on the outer surface thereof which are able to be countersunk radially below the outer surface of the punch. The stamping device is only extended and used in the regions in which local lubricant channels are to be incorporated. To this end, the punch is axially passed through the inner face of the bearing bushing and, at the same time, rotated with the stamping device which is ready for use. In this manner, locally curved lubricant slots extending extra-axially may be produced on the inner face of the bushing. By the material displaced by the production of the grooves, the porosity of the sintered material is locally reduced.

The object of the invention is to develop a production method for the internal structuring of slide bearing bushings.

The invention is disclosed by the below features and advantageous embodiments and developments of the invention.

The invention encompasses a method for producing an internally structured slide bearing bushing comprising the following successive method steps:

a) providing a slide bearing bushing with at least one bearing region which is formed as a hollow cylinder with an internal surface and which has an external diameter and an internal diameter, b) providing an external tool with a through-opening, the smallest internal diameter thereof being smaller than the external diameter of the bearing region of the slide bearing bushing provided, wherein the through-opening on at least one side has a conical widened portion, the maximum internal diameter thereof being larger than the external diameter of the bearing region of the slide bearing bushing provided, c) providing an internal tool which has an integral cylindrical operating region with an external surface with a structure, wherein the maximum external diameter of the operating region is smaller than the internal diameter of the bearing region of the slide bearing bushing provided, d) inserting the internal tool into the bearing region of the slide bearing bushing, e) introducing the slide bearing bushing and the internal tool into the conical widened portion of the through-opening of the external tool, f) pressing the slide bearing bushing by means of the internal tool into the through-opening of the external tool, reducing the external and internal diameters of the bearing region of the slide bearing bushing, so that the internal surface of the bearing region is pressed onto the external surface of the internal tool and an internal structure is stamped into the internal surface of the bearing region as a negative shape of the structure of the external surface of the internal tool, g) removing the slide bearing bushing from the through-opening of the external tool, and h) radially widening the slide bearing bushing so that the internal tool is able to be removed from the slide bearing bushing.

The invention is based on the recognition that the production method consists of a series of successive drawing process steps. In the first method step, the internal surface of a hollow cylindrical slide bearing bushing to be treated is prepared for mechanical shaping. To this end, the internal surface of the bushing is generally smooth and clean. Optionally, drawing oil or other substances useful for the shaping may be applied to the surface. In a subsequent method step, an external tool which serves as an external drawing matrix or drawing die is provided. This may be designed, for example, with a cylindrical through-opening. The slightly smaller internal diameter of the through-opening compared with the external diameter of the bushing effects the shaping during the drawing process. In this case, the smaller through-opening of the external tool effects a radial tapering of the bushing cross section. The through-opening of the external tool at least on the input side has a conical widened portion with a larger maximum internal diameter than the external diameter of the bushing, so as to convey the bushing into the cylindrical shaping region in the manner of a guide opening.

The internal tool is designed, for example, in the form of a calibrating die. Said die has an integral cylindrical operating region with a structured external surface. In a further method step, this structure is stamped onto the internal surface of the slide bearing element. In order to be able to position the calibrating die in the slide bearing, the maximum external diameter of the operating region is smaller than the internal diameter of the bearing region.

This provides the conditions that the internal tool is able to be introduced into the bearing region of the slide bearing bushing via the conical widened portion of the through-opening of the external tool. The actual shaping process takes place by pressing the slide bearing bushing into the through-opening of the external tool, reducing the external diameter and internal diameter of the bearing region of the slide bearing bushing. In this case, the internal surface of the bearing region is pressed onto the external surface of the internal tool and an internal structure is stamped into the internal surface of the bearing region as a negative shape of the structure of the external surface of the internal tool.

After this shaping step, the slide bearing bushing is removed from the through-opening of the external tool. This takes place, for example, by pushing out the bushing or by opening the external tool. So that the slide bearing bushing may be removed from the internal tool, said bushing has to be radially widened at least sufficiently far that the external structure of the tool used for the shaping also releases the bushing. Widening may take place mechanically in a resilient manner, by the bushing being widened by releasing the tension outside the drawing matrix. Widening may also take place thermally, by the sliding element being at least locally heated. This method step is suitable, in particular, for seamless bushing material. Mechanical widening may also take place in slide bearing bushings by means of an impact, by the bushing being widened at the butt joint and thus the diameter enlarged.

The particular advantage is that, by the structuring of the bearing region, sliding elements which are ready for installation may be produced without further post-treatment. The structured surfaces according to the invention may considerably improve the run-in behavior of the sliding elements and thus the service life. Additionally, the drawing process steps are a relatively cost-effective variant of the production process.

In principle, the internal structure of the slide bearing bushing may also have groove-like channels. These channels may be configured as longitudinal channels or helical channels. In a preferred embodiment of the invention, the internal structure of the slide bearing bushing may comprise spatially defined recesses and/or raised portions. In other words, the internal structure is made up of structural elements which are configured locally as indentations or domes.

Advantageously, the internal structure of the slide bearing bushing may comprise recesses and/or raised portions which are statistically distributed. In addition to regular surface structures, this alternative may provide a particularly uniform distribution of lubricant.

Accordingly, it is also possible that the internal structure of the slide bearing bushing comprises recesses and/or raised portions, the shape thereof varying in a non-uniform manner. In such an embodiment of the structure, the supply of lubricant may be optimized.

In an advantageous embodiment of the invention, the internal structure of the slide bearing bushing may comprise recesses of variable depths and/or raised portions of variable heights. The hollow spaces of variable shapes and designs thus formed may also be provided for receiving undesirable particles of dirt.

In one advantageous embodiment of the invention, the slide bearing bushing may consist of a compact material having resilient properties and the radial widening may take place by utilizing the resilient properties of the material. By means of the resilient properties, the slide bearing bushing is radially widened as soon as it has left the through-opening of the external tool. Due to the widening, the internal tool is also released, said internal tool subsequently being able to be removed from the inside of the bushing by being pulled out.

In a preferred embodiment of the invention, the radial widening may take place by heating the slide bearing bushing, utilizing the thermal expansion of the material. This measure serves, for example, to assist the resilient widening, whereby the bushing also releases the raised structures of the internal tool.

In a particularly preferred embodiment, the slide bearing bushing may be a turned slide bearing bushing. In turned slide bearings, which are produced from cast, pressed or drawn tubes and/or rods, the height of the stamped structures is dimensioned so that it is less than the radial widening caused by relieving the load.

In a further advantageous embodiment of the invention, the slide bearing bushing may be a slide bearing bushing roll-formed from a strip material and may have a butt joint extending parallel to the axis thereof. In roll-formed slide bearings, which are generally produced from strips and have a joint, a widening may take place by pulling apart the butt joint surfaces. In latched butt joints, a certain clearance may be present which permits the required widening.

Advantageously, the radial widening may take place by widening the butt joint. Thus, in roll-formed slide bearings, the joint present on the butt joint surfaces may also be widened by purely resilient widening, in order to release the internal tool.

Exemplary embodiments of the invention are described in more detail with reference to the schematic drawings.

Figure 2:
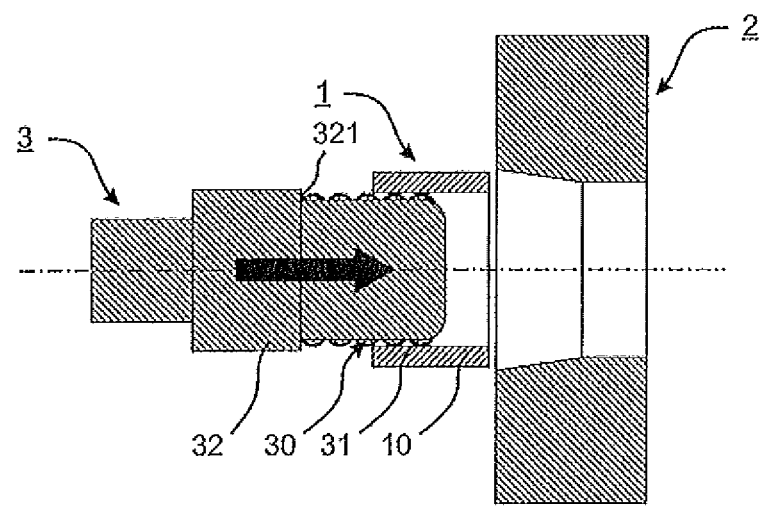
Figure 3:
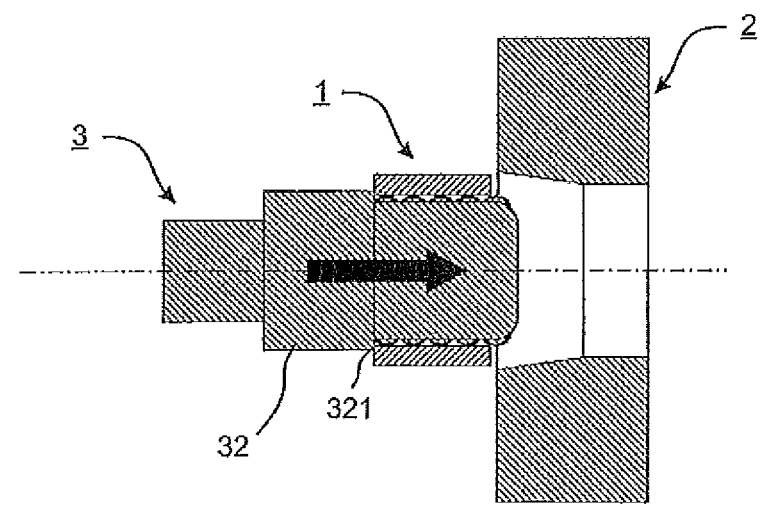
Figure 4:
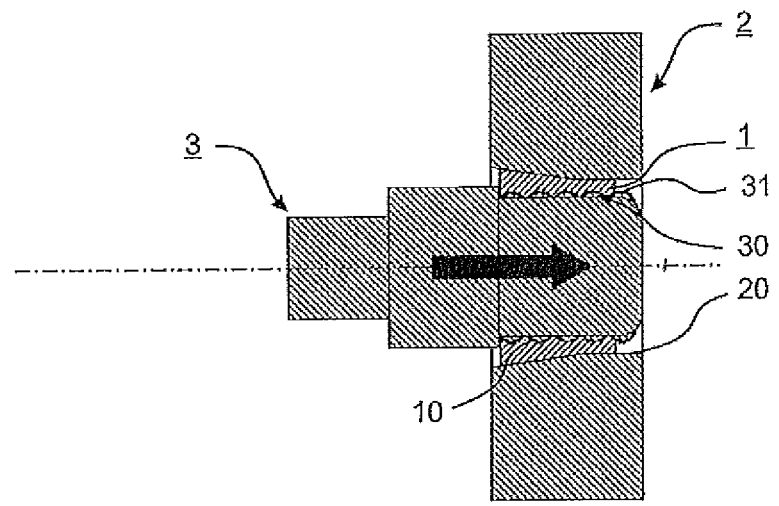
Figure 5:
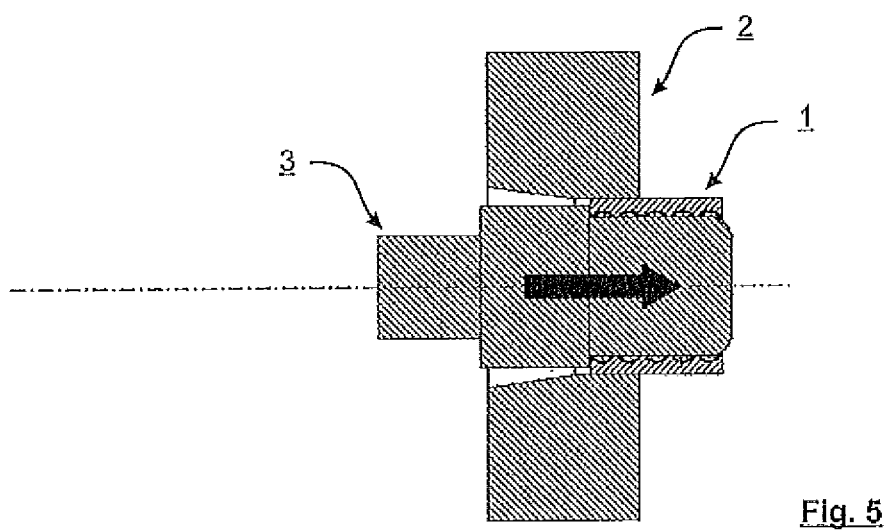
Figure 6:
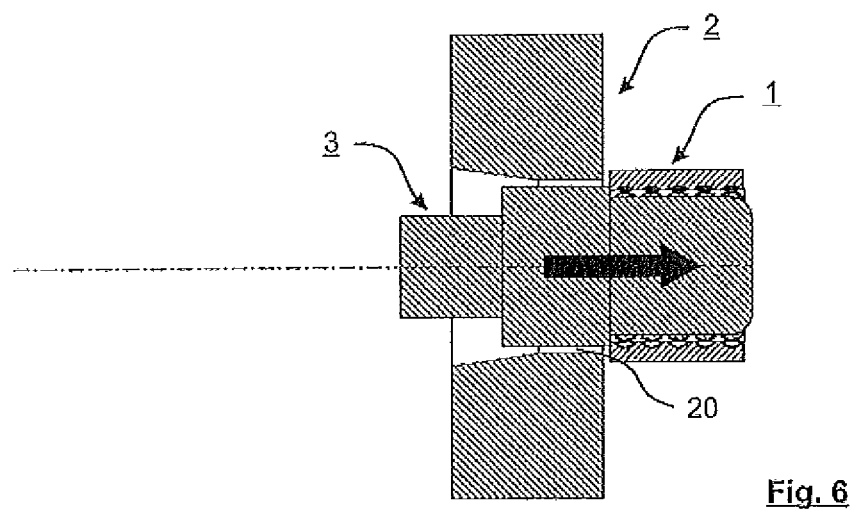
Figure 7:
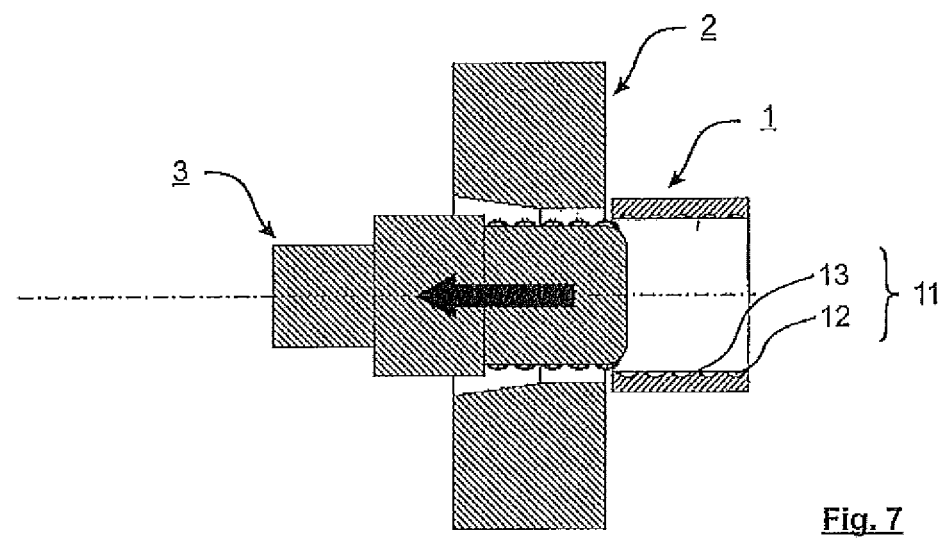
Figure 8:
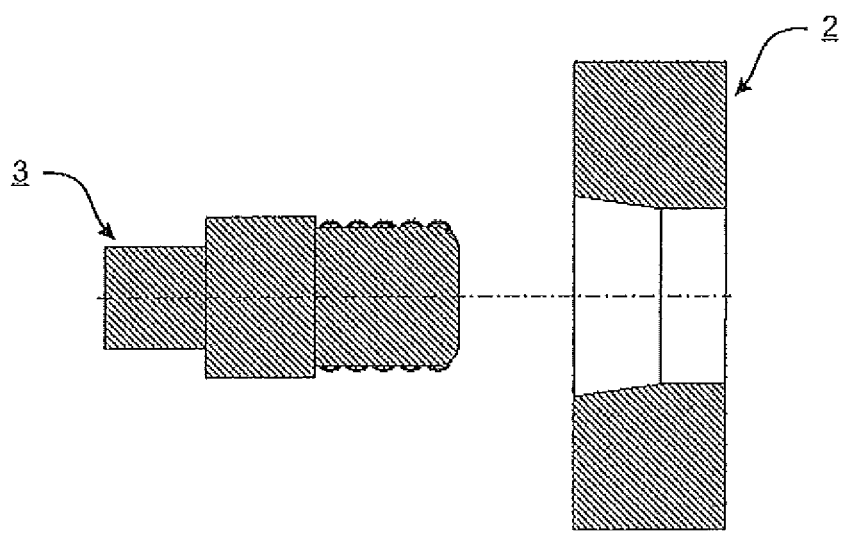
Figure 9:
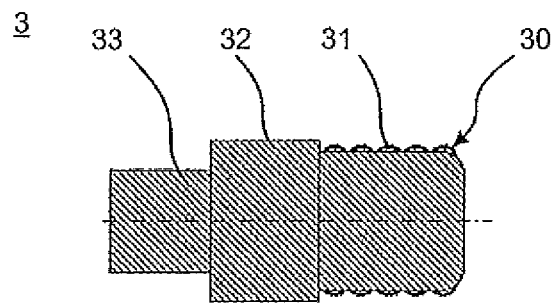
Figure 10:
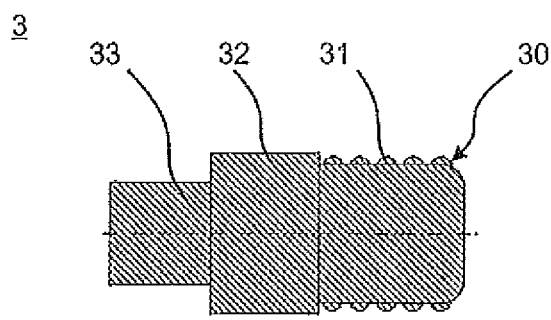
Figure 11:
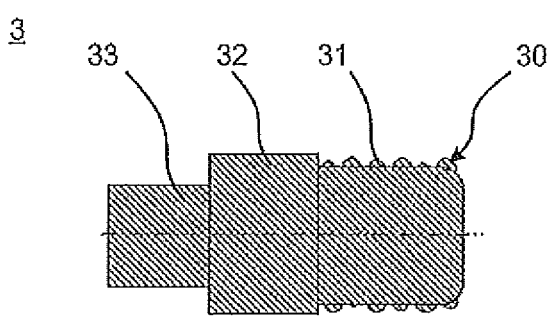

In the drawings:

FIG. 1 shows schematically a cross section of the tool arrangement at the start of the production method, FIG. 2 shows schematically a cross section of the tool arrangement when introducing the internal tool into the slide bearing bushing, FIG. 3 shows schematically a cross section of the tool arrangement after introducing the internal tool into the slide bearing bushing, FIG. 4 shows schematically a cross section of the tool arrangement when pressing the slide bearing bushing into the external tool, FIG. 5 shows schematically a cross section of the tool arrangement when pressing the slide bearing bushing into the external tool shortly before the completion of the pressing process, FIG. 6 shows schematically a cross section of the tool arrangement after the completion of the pressing process, FIG. 7 shows schematically a cross section of the tool arrangement when removing the internal tool, FIG. 8 shows schematically a cross section of the tool arrangement at the end of the production process, FIG. 9 shows schematically a cross section of the internal tool, FIG. 10 shows schematically a cross section of an alternative surface structure of an internal tool, and FIG. 11 shows schematically a cross section of a further alternative surface structure of an internal tool.

Parts which correspond to one another are provided in all of the figures with the same reference numerals.

FIG. 1 shows schematically a cross section of the tool arrangement at the start of the production method. In this method step the slide bearing bushing 1, the external tool 2 and the internal tool 3 are provided. The internal tool 3 comprises a cylindrically shaped operating region 30 which has a structure 31. This structure 31 is stamped in a subsequent method step in the bearing region 10 of the slide bearing bushing 1. In this case, the structure 31 is dome-shaped portions with a relatively rough surface.

On the input side, the cylindrical through-opening 20 of the external tool 2 on the input side end has a conical widened portion 201 in order to introduce the slide bearing bushing 1 into the shaping region. The internal tool 3 has in the central region a flange 32, the stop thereof 321 fixing the position of the slide bearing bushing 1 on the operating region 30. In order to form a stop 321 for the front face of the slide bearing bushing 1, the diameter of the flange 32 is larger than the internal diameter of the bushing. The axial force transmission originates from a punch 33 which is connected to the flange 32. The internal tool 3 may be configured in one piece or in multiple parts. In multipart embodiments, if required, the operating region 30 may be replaced in order to use different structures 31, for example.

FIG. 2 shows schematically a cross section of the tool arrangement when inserting the internal tool into the slide bearing bushing 1. The bearing region 10 located on the inner face of the slide bearing bushing 1, in this case, is pushed over the operating region 30 of the internal tool 3 in the direction of the stop 321 on the flange 32. During this insertion the structure 31 does not yet engage in the bearing region 10. The slide bearing bushing 1 in this case is not yet in the engagement region of the external tool 2.

FIG. 3 shows schematically a cross section of the tool arrangement after inserting the internal tool 3 into the slide bearing bushing 1. After the slide bearing bushing 1 comes into contact with the stop 321 of the flange 32, said slide bearing bushing is entrained by the internal tool 3 into the external tool 2.

FIG. 4 shows schematically a cross section of the tool arrangement when pressing the slide bearing bushing 1 into the external tool 2. In this method step, the slide bearing bushing 1 is shaped in the external tool 2. In this case, the slide bearing bushing 1 is pressed through the narrower through-opening 20 and reduced in diameter. This takes place on the inner face of the slide bearing bushing 1 such that the structure 31 in the operating region 30 of the internal tool 3 is pressed into the bearing region 10.

FIG. 5 shows schematically a cross section of the tool arrangement when pressing the slide bearing bushing 1 into the external tool 2 shortly before the completion of the pressing process. In this method step, the slide bearing bushing 1 is pressed together with the internal tool 3 by the external tool 2 axially over the entire length thereof.

FIG. 6 shows schematically a cross section of the tool arrangement after completion of the pressing process. In this method step, the slide bearing bushing 1 emerges from the through-opening 20 of the external tool 2. Due to the resilient properties of the material of the slide bearing bushing 1, said slide bearing bushing is widened in the radial direction and again releases the internal tool 3.

FIG. 7 shows schematically a cross section of the tool arrangement when removing the internal tool 3. The internal tool 3 in this case is axially pulled out of the external tool 2 in the opposing direction to the pressing direction, and at the same time slides over the slide bearing bushing 1. In the bearing region 10, the internal structure 11 is now shaped as recesses 12 and raised portions 13 in the surface.

FIG. 8 shows schematically a cross section of the tool arrangement at the end of the production process. In this basic position of the external tool 2 and the internal tool 3, a further slide bearing bushing may be incorporated into the process once again.

Moreover, FIGS. 9 to 11 show advantageous embodiments of the structure 31 of the operating region 30 of an internal tool 3. FIG. 9 shows schematically a cross section of the internal tool with dome-shaped portions having a relatively rough surface. The operating region 30 is defined by the flange 32 to which the punch 33 is adjoined for the force introduction. In the method step, the axial pressing and pulling forces are introduced via the punch 33. FIG. 10 shows schematically a cross section of an alternative surface structure of an internal tool. This is a further variant of a structure 31 with dome-shaped portions having a smooth surface. The domes are designed to be the same in terms of shape and size. However, a cross section of a further alternative surface structure of an internal tool is shown schematically in FIG. 11. The domes of different size are arranged statistically in the operating region 30.

LIST OF REFERENCE NUMERALS

1 Slide bearing bushing
10 Bearing region
11 Internal structure
12 Recesses
13 Raised portions
2 External tool
20 Through-opening
201 Widened portion
3 Internal tool
30 Operating region
31 Structure
32 Flange
321 Stop
33 Punch

The invention claimed is:

1. A method for producing an internally structured slide bearing bushing comprising the steps of:
   roll-forming a strip material into a slide bearing bushing with at least one bearing region which is formed as a hollow cylinder with an internal surface and which has an external diameter, an internal diameter and a butt joint extending parallel to the axis thereof;
   providing an external tool with a through-opening, the smallest internal diameter of the through-opening being smaller than the external diameter of the bearing region of the slide bearing bushing, the through-opening on at least one side having a conical widened portion having a maximum internal diameter larger than the external diameter of the bearing region of the slide bearing bushing;
   providing an internal tool which has an integral cylindrical operating region with an external surface with a structure, the maximum external diameter of the operating region being smaller than the internal diameter of the bearing region of the slide bearing bushing;
   inserting the internal tool into the bearing region of the slide bearing bushing;
   introducing the slide bearing bushing and the internal tool into the conical widened portion of the through-opening of the external tool;
   pushing the slide bearing bushing and the cylindrical operating region of the internal tool together through the through-opening of the external tool with a stop provided on a flange of the internal tool, reducing the external and internal diameters of the bearing region of the slide bearing bushing so that the internal surface of the bearing region is pressed onto the external surface of the internal tool and an internal structure is stamped into the internal surface of the bearing region as a negative shape of the structure of the external surface of the internal tool;

pushing the slide bearing bushing completely through the through-opening of the external tool; and radially widening the external diameter of the slide bearing bushing so that the internal tool is able to be removed from the slide bearing bushing by contact between the slide bearing bushing and the external tool and withdrawn from the through-opening of the external tool, whereby the radial widening takes place by widening the butt joint.

2. The method according to claim 1, characterized in that the internal structure of the slide bearing bushing comprises spatially defined recesses and/or raised portions.

3. The method according to claim 1, characterized in that the slide bearing bushing consists of a compact material having resilient properties and the radial widening takes place by utilizing the resilient properties of the material.

4. The method according to claim 1, characterized in that the radial widening takes place by heating the slide bearing bushing, utilizing the thermal expansion of the material.

* * * * *